United States Patent

Egami et al.

[11] Patent Number: 5,900,453
[45] Date of Patent: May 4, 1999

[54] HEAT-RESISTANT LUBRICATIVE RESIN COMPOSITION

[75] Inventors: Masaki Egami, Yokkaichi; Takumi Shimokusuzono; Hideyuki Tsutsui, both of Kuwana; Sadatoshi Inagaki, Yokkaichi, all of Japan

[73] Assignee: NTN Corporation, Osaka, Japan

[21] Appl. No.: 08/678,493

[22] Filed: Jul. 9, 1996

[30] Foreign Application Priority Data

Jul. 11, 1995 [JP] Japan .................................. 7-174857
Jun. 28, 1996 [JP] Japan .................................. 8-169773

[51] Int. Cl.⁶ .................................................. C08L 79/08
[52] U.S. Cl. ......................... 524/514; 525/133; 525/151
[58] Field of Search .................................. 525/151, 425, 525/133; 524/514

[56] References Cited

U.S. PATENT DOCUMENTS

| | | | |
|---|---|---|---|
| 4,417,020 | 11/1983 | Bailey | 525/151 |
| 4,871,817 | 10/1989 | Rock | 525/425 |
| 4,908,419 | 3/1990 | Holub | 525/425 |
| 5,312,866 | 5/1994 | Tsutsumi | 525/425 |

*Primary Examiner*—Patricia A. Short
*Attorney, Agent, or Firm*—Nikaido Marmelstein Murray & Oram, LLP

[57] ABSTRACT

A heat-resistant, lubricative resin composition which can withstand temperatures of 250–270° C., which is wear-resistant and low in friction, and which is less likely to attack a soft alloy such as aluminum alloy, and a high-performance, heat-resistant sliding bearing formed from the abovementioned heat-resistant, lubricative resin composition. The resin composition is made up of a thermoplastic polyimide resin represented by the following formula, and 8–38% by volume of tetrafluoroethylene resin and 3–25% by volume of aromatic polyester resin,

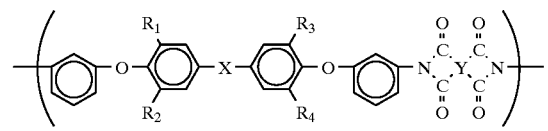

(where X is a direct connection or a group selected from the group consisting of a hydrocarbon group having 1–10 carbon atoms, a hexafluorinated isopropylidene group, a carbonyl group, a thio group and a sulfonic group; R1–R4 are hydrogen, lower alkyl groups, lower alkoxy groups, chlorine or bromine, and may be the same or different from one another; Y is a tetravalent group selected from the group consisting of an aliphatic group having two or more carbon atoms, a cyclic aliphatic group, a monocyclic aromatic group, a condensed polycyclic aromatic group, a non-condensed polycyclic aromatic group made up of aromatic groups coupled together direcly or through crosslinking agents.)

4 Claims, 2 Drawing Sheets

HEAT-RESISTANT LUBRICATIVE RESIN COMPOSITION

BACKGROUND OF THE INVENTION

This invention relates to a heat-resistant, lubricative resin composition and a heat-resistant sliding bearing which can be used as sliding members of a heating/fixing unit in an electrophotographic device.

Sliding bearings of synthetic resin are now used in broader fields of art than before. It is required that such sliding bearings have high heat resistance so that they can exhibit good friction/wear properties especially at elevated temperatures. Such heat-resistant bearings are used e.g. in heating/fixing units for copying machines and laser beam printers.

Today, many of mating members of these bearings are made of a lightweight and soft material such as aluminum alloy. Thus, it is required to use bearings that will never damage even such soft mating members.

We will now describe how sliding bearings are used in heating/fixing units of copiers and laser beam printers.

Copiers and laser beam printers for transferring data on original images to recording material or transfer material in the form of charged images are also called electrophotographic devices. FIG. 3 shows a heating/fixing unit of such a device. It has a heating roller 10 for heating and fixing toner images on a transfer material, and a press roller 11 for rotating the transfer material by pressing it against the heating roller 10.

The heating roller 10 is in many cases made of an Mg-containing aluminum alloy and is heated by a heater 12 to about 150–230° C. The press roller 11 is made of iron and covered with e.g. silicone rubber. It is heated to about 70–150° C. by heat transfer from the heating roller 10.

FIG. 4 shows a different heating/fixing unit. It has, instead of the metallic heating roller 10, an endless annular fixing film 15 made of a heat-resistant synthetic resin and having a release coating. A ceramic heater 16 is pressed against the press roller 11 through the fixing film 15 to improve heat transfer efficiency. The press roller 11 of this unit is heated to higher temperatures than the press roller 11 of the unit shown in FIG. 3, in which the metallic heating roller 10 is used.

The rollers, which are heated to high temperatures as described above, are supported at both ends by synthetic resin sliding bearings 13 and 14 (in FIG. 3) or by sliding bearings corresponding to bearings 14 (in FIG. 4). Conventional such bearings were made of polyphenylene sulfide (hereinafter referred to as PPS) resin because of its high heat resistance. PPS resin is a thermoplastic synthetic resin having good heat resistance and mechanical strength. But it has poor self-lubricating properties, so that it is usually necessary to add graphite, tetrafluoroethylene resin, lubricating oil, metallic oxides, aromatic polyamide resin, etc. as lubricants.

For higher performance of an electrophotographic device having sliding members made of synthetic resin, more specifically, in order to increase its copying or printing speed, it is necessary to melt and fix toner as quickly as possible. For this purpose, it is essential that the sliding bearings 13 and 14 be made of a material that can withstand heating up to a temperature of 250–270° C.

In this regard, the conventional sliding members made of PPS resin, having a melting point near 280° C., are not sufficiently heat-resistant for the above the purpose.

Unexamined Japanese Patent Publication 63-8455 proposes to improve the sliding properties of an inherently heat-resistant polyimide resin by adding tetrafluoroethylene resin.

Unexamined Japanese Patent Publication 63-314712 proposes to add tetrafluoroethylene resin and a hardened phenolic resin to a polyimide resin to improve its wear resistance.

Such conventional sliding members made of polyimide resins exhibit good sliding properties with respect to mating members which are hard at room temperature. But if they are brought into sliding contact with mating members made of a soft metal such as aluminum or an aluminum alloy, they tend to severely damage the mating members.

It is of course impossible to prevent damage to soft aluminum alloys simply by adding carbon fiber to the compositions. When the mating members are damaged, friction/wear properties may be aggravated.

An object of this invention is to provide a heat-resistant, lubricative resin composition which can withstand temperatures of 250–270 C., which is wear-resistant and low in friction, which is less likely to attack a soft alloy such as aluminum alloy, and which have superior properties to any conventional composition formed mainly from a polyimide resin, and high-performance, heat-resistant sliding bearings formed from the abovementioned heat-resistant, lubricative resin composition.

SUMMARY OF THE INVENTION

According to this invention, there is provided a heat-resistant, lubricative resin composition comprising as a main component a thermoplastic polyimide resin represented by the following formula, and 8–38% by volume of tetrafluoroethylene resin and 3–25% by volume of aromatic polyester resin, Formula (1)

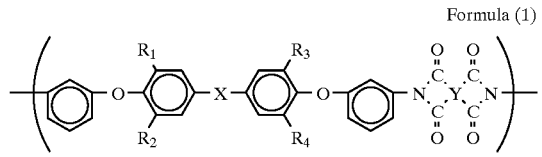

(where X is a direct connection or a group selected from the group consisting of a hydrocarbon group having 1–10 carbon atoms, a hexafluorinated isopropylidene group, a carbonyl group, a thio group and a sulfonic group; R1–R4 are hydrogen, lower alkyl groups, lower alkoxy groups, chlorine or bromine, and may be the same or different from one another; Y is a tetravalent group selected from the group consisting of an aliphatic group having two or more carbon atoms, a cyclic aliphatic group, a monocyclic aromatic group, a condensed polycyclic aromatic group, a non-condensed polycyclic aromatic group made up of aromatic groups coupled together directly or through crosslinking agents)

The heat-resistant, lubricative resin composition may further comprise 2–20% by volume of para aromatic polyamide fiber.

Also, the heat-resistant, lubricative resin composition may further comprise 2–15% by volume of scaly graphite.

Otherwise, the heat-resistant, lubricative resin composition may further comprise 5–40% by volume of at least one heat-resistant resin selected from the group consisting of polyether ketone resin, polyether imide resin and polyether sulfonic resin.

The aromatic polyester resin may be a resin containing repeating units represented by Formula (2) below.

Formula (2)

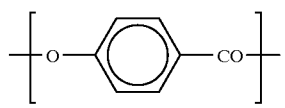

The para aromatic polyamide fibers may be para aromatic polyamide fibers containing repeating units represented by the following Formula (3).

Formula (3)

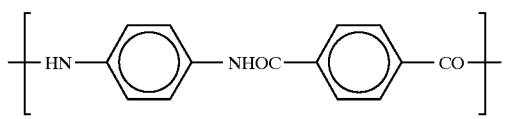

The heat-resistant sliding bearing according to this invention is formed from the abovementioned heat-resistant, lubricative resin composition.

Other features and objects of the present invention will become apparent from the following description made with reference to the accompanying drawings, in which:

DETAILED DESCRIPTION OF THE PREFERRED EMBODIMENT

Figure 1:
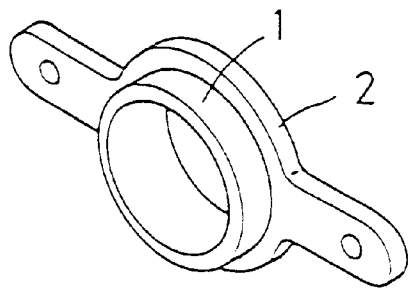
FIG. 1 is a perspective view of one embodiment.

The heat-resistant, lubricative resin composition according to this invention comprises as a main component a heat-resistant thermoplastic polyimide resin, and an aromatic polyester resin, which has a large critical PV value, and tetrafluoroethylene resin, which offers high sliding properties. As a whole, the composition exhibits high heat resistance and good sliding and mechanical properties. The composition is injection-moldable because the main component is an injection-moldable thermoplastic polyimide resin, and the remaining components are added in such amounts that they will not impair the physical properties of the main component.

The para aromatic polyamide fibers added to the composition have their molecular chains arranged in the axial direction of the fibers, so that the intermolecular force is weak in the direction perpendicular to the axial direction, though their resilience and strength are both high in the axial direction. Due to their high axial strength, such para aromatic polyamide fibers can improve the wear resistance of the resin composition. But it is considered that they will not damage any soft mating member because their molecular chains buckle easily when compressed transversely.

The thermoplastic polyimide resin used in this invention has the structure represented by Formula (1). It is formed by reacting an ether diamine represented by the following Formula (4) with a tetracarboxylic dianhydride to obtain a polyamidic acid and cyclodehydrating the polyamidic acid. Typical thermoplastic polyimide resins (in which R1–R4 are all hydrogen atoms) include one sold by Mitsui Toatsu Chemical under the trade name "AURUM". The manufacturing method is well-known, as disclosed in Unexamined Japanese Patent Publications 61-143478, 62-68817 and 62-86021.

Formula (4)

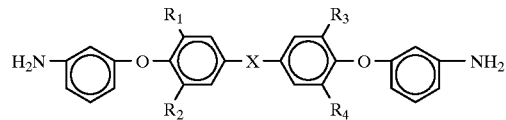

This thermoplastic polyimide resin shows themoplasticity while maintaining its inherent heat resistance, so that the resin composition according to the present invention can be molded with relative ease by compression molding, injection molding, extrusion molding or any other melt-molding method.

Specific diamines represented by Formula (4) include:

bis(4-(3-aminophenoxy)phenyl)methane,
1,1-bis(4-(3-aminophenoxy)phenyl)ethane,
1,2-bis(4-(3-aminophenoxy)phenyl)ethane,
2,2-bis(4-(3-aminophenoxy)phenyl)propane,
2-(4-(3-aminophenoxy)phenyl)-2-(4-(3-aminophenoxy)-3-methylphenyl)propane,
2,2-bis(4-(3-aminophenoxy)-3-methylphenyl)propane,
2-(4-(3-aminophenoxy)phenyl)-2-(4-(3-aminophenoxy)-3,5-dimethylphenyl)propane,
2,2-bis(4-(3-aminophenoxy)3,5-dimethylphenyl)propane,
2,2-bis(4-(3-aminophenoxy)phenyl)butane,
2,2-bis(4-(3-aminophenoxy)phenyl-1,1,1,3,3,3-hexafluoropropane,
4,4'-bis(3-aminophenoxy)biphenyl,
4,4'-bis(3-aminophenoxy)-3-methylbiphenyl,
4,4'-bis(3-aminophenoxy)-3,3'-dimethylbiphenyl,
4,4'-bis(3-aminophenoxy)-3,5-dimethylbiphenyl,
4,4'-bis(3-aminophenoxy)-3,3',5,5'-tetramethylbiphenyl,
bis(4-(3-aminophenoxy)phenyl)ketone,
bis(4-(3-aminophenoxy)phenyl)sulfide,
bis(4-(3-aminophenoxy)phenyl)sulfone. A mixture thereof may be used.

Other diamines may be mixed in such amounts that the melt-flowability of the thermoplastic polyimide resin will not be impaired. The following dimethyl amines may be mixed into the composition:

m-aminobenzyl amine,
p-aminobenzyl amine,
3,3'-diaminodiphenylether,
3,4'-diaminodiphenylether,
4,4'-diaminodiphenylether,
3,3'-diaminodiphenylsulfide,
3,4'-diaminodiphenylsulfide,
4,4'-diaminodiphenylsulfide,
3,3'-diaminodiphenylsulfone,
3,4'-diaminodiphenylsulfone,
4,4'-diaminodiphenylsulfone,
3,3'-diaminobenzophenone,
3,4'-diaminobenzophenone,
4,4'-diaminobenzophenone,
1,3-bis(3-aminophenoxy)benzene,
1,3-bis(4-aminophenoxy)benzene,
1,4-bis(3-aminophenoxy)benzene,
1,4-bis(4-aminophenoxy)benzene, 2,2-bis(4-(4-aminophenoxy)phenyl)propane,
4,4'-bis(4-aminophenoxy)biphenyl,
4,4'-bis(4-aminophenoxy)ketone,
bis (4-(4-aminophenoxy)phenyl)sulfide, and
bis (4-(4-aminophenoxy)phenyl)sulfone.

They should be added by 30% or less, preferably 5% or less.

The most desirable thermoplastic polyimide resin is obtained by reacting one of the abovementioned diamines with a tetracarboxylic dianhydride in an organic solvent and dehydrating them for ring closure. The tetracarboxylic dianhydride used in this reaction is represented by the following Formula (5) (Y in this formula represents the same as Y in Formula 1).

Formula (5)

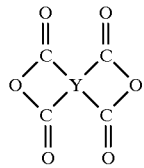

Tetracarboxylic dianhydride represented by Formula (5) include:

ethylene tetracarboxylic dianhydride,
1,2,3,4-butanetetracarboxylic dianhydride,
cyclopentanecarboxylic dianhydride,
pyromellitic acid dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
bis(3,4-dicarboxyphenyl)ether dianhydride,
bis(3,4-dicarboxyphenyl)sulfone dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride,
1,2,7,8-phenanthrenetetracarboxylic dianhydride,
4,4'-(p-phenylenedioxy)diphthalic dianhydride, and
4,4'-(m-phenylenedioxy)diphthalic dianhydride.

In this invention, these anhydrides may be singly or in combination.

The tetrafluoroethylene resin (hereinafter PTFE) used in this invention may be powder for molding, fine powder for solid lubricant, or a combination thereof.

Commercially available PTFE's include TEFLON 7J TLP-10 by Mitsui Dupont Fluorochemical, FLUON G163 by Asahi Glass, Polyflon M15, LOWPOLYMERS L5 by DAIKIN KOGYO, and HOSTAFLON TF9205 by Hoechst. Also, a PTFE modified by alkylvinylether may be used.

According to this invention, the content of such tetrafluoroethylene resin (PTFE) should be 8–38% by volume. If less than 8% by volume, lubricating properties will not be good. If over 38% by volume, moldability will worsen markedly. Preferably, the content of PTFE should be 10–35% by volume.

The aromatic polyester resin used in this invention is a homopolymer of polyoxybenzoylpolyester having a melting point near 610° C. Methods of forming such aromatic polyester resins are well-known in the art, as disclosed in Examined Japanese Patent Publications 46-6796 and 47-47870 and Unexamined Japanese Patent Publications 54-46287 and 54-46291. Commercially available polyoxybenzoylpolyesters having the structure shown in Formula (2) include SUMICA Super E101 by Sumitomo Chemical.

The content of such aromatic polyester resin should be 3–25% by volume. If less than 3% by volume, lubricating properties will not be good. If over 25% by volume, melt viscosity will increase excessively, making molding difficult or lowering mechanical strength. Preferably, its content should be 3–20% by volume.

The para aromatic polyamide fiber used in this invention is a polymer containing repeating units represented by Formula (3) and has a different molecular structure from a meta aromatic polyamide resin. Commercially available para aromatic polyamide fibers include KEVLAR by Dupont Toray Kevlar, Twaron by Japan Aramid (AKZO) and Technora by Teijin.

Good results were obtained when aromatic polyamide fiber having a fiber length of 0.15–3 mm and an aspect ratio of 10–230 was used. More preferably fiber length is 0.15–1.5 mm.

If the fiber length of the aromatic polyamide fiber is below the above range, wear resistance of the composition will be insufficient. If over the predetermined range, fibers will not disperse uniformly in the composition.

If the aspect ratio is below the above range, the fiber will be nearly in a powder form and the wear resistance will not be improved sufficiently. If over the above range, fibers will not disperse uniformly in the composition.

The content of such aromatic polyamide fiber should be 2–20% by volume. If lower than 2% by volume, lubricating properties will not be good. If higher than 20% by volume, wear resistance will drop.

The scaly graphite used in this invention may be natural or artificial one. One having an average particle diameter of about 10 μm is preferable because it is high in frictional and wear properties and easy to mold. Scaly graphite with such particle diameter include ACP (fixed carbon: 99.5%) by Japan Graphite and KS-6 or KS-10 (fixed carbon: 99.5%) by LONZA.

By adding such graphite by 2–15%, it is possible to improve the wear resistance of the composition and to reduce the degree of shrinkage of the composition when an article molded from the composition of the invention is subjected to heat treatment for crystallization. If its content is less than 2%, it is insufficient to prevent shrinkage. If over 15% by volume, the molded article will be brittle.

The polyether ketone resin, that is, one of the heat-resistant resins added to the heat-resistant, lubricative resin composition of this invention, may be a polymer having repeating units represented by the following Formulas 6–8. Commercially available such resins include PEEK by VICTREX (with structure shown in Formula 6), PEK by VICTREX (shown in Formula 7) and Ultrapek by BASF (in Formula 8).

Formula (6)

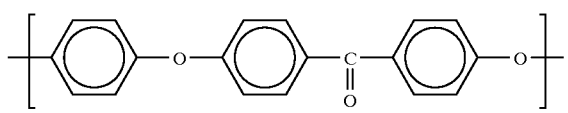

Formula (7)

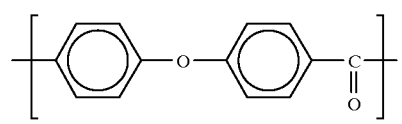

Formula (8)

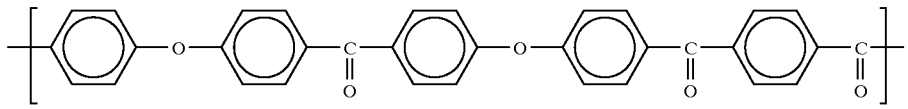

The polyether imide resin added to the heat-resistant, lubricative resin composition of this invention may be a polymer having repeating units represented by Formula (9) below. Commercial versions of such resins include ULTEM by General Electric.

tal polymers include XYDAR SRT 300 or SRT 500 by Japan Petrochemical and SUMICA Super LCP E 4000 or E5000 by Sumitomo Chemical.

Formula (9)

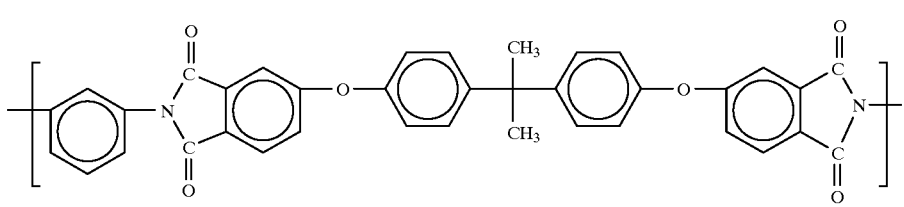

The polyether sulfonic resin added to the heat-resistant, lubricative composition according to this invention may be a polymer having repeating units represented by the Formula (10). Commercially available such resins include Ultrason by BASF, RADEL by Amoco and VICTREX PES by Sumitomo Chemical.

Formula (10)

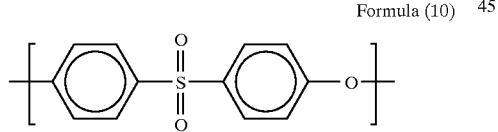

By adding 5–40% by volume of at least one heat-resistant resin selected from the group consisting of polyether ketone resins, polyether imide resins and polyether sulfonic resins to the heat-resistant, lubricative resin composition of the present invention, it is possible to improve, among various mechanical properties, the strength and fatigue properties. If its content is less than 5% by volume, it is impossible to improve the strength. If over 40% by volume, high heat resistance intrinsic to thermoplastic polyimide will drop. More preferably, its content is 5–30% by volume.

Further, 1–5% by volume of a thermotropic liquid crystal polymer, which is a copolymer having the basic structures (I) (II) or (III) represented by Formula (11), may be added to improve the flow characteristics of the heat-resistant, lubricative resin composition of this invention during melt molding. Commercially available thermotropic liquid crys- Formula (I)

(I)

(II)

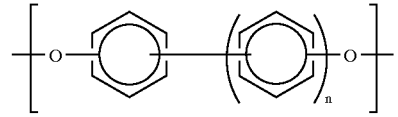

(III)

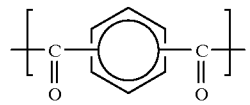

These additives may be added to and mixed with the thermoplastic polyimide resin in any known way. Typically, the resin as the main component and the other materials are dry-mixed separately or all together in a mixer such as a Henschel mixer, a ball mill or a tumbler mixer, and then supplied to an injection molding machine or a melt extruder which allows good melt mixing. Otherwise, these materials may be mixed by melting with heat rolls, a kneader, a Banbury mixer or a melt extruder.

The composition according to this invention may be formed by compression molding, extrusion molding or injection molding. Otherwise, it may be mixed by melting, pulverized in a jet mill or a freeze crusher, and classified to a predetermined particle diameter or subjected to fluidized bed coating or electrostatic powder coating without classifying. Also, powder dispersed in a solvent may be spray-coated or dip-coated.

Further, various additives may be mixed into the lubricative composition comprising a thermoplastic polyimide resin as a main component. For example, in order to improve the lubricating properties of the composition, a wear resistance improver may be added. Such wear resistance improvers include powder of carbon, mica, talc, wollastonite, metallic oxide, etc., whisker of potassium titanate, titanium oxide, zinc oxide, aluminum borate, calcium carbonate, graphite, calcium sulphate, etc., molybdenum disulfide, phosphate, carbonate, stearate, and molten fluororesins such as PFA, FEP, ETFE and EPE.

The heat-resistant sliding bearing formed from the resin composition according to this invention is not limited in shape. Its shape should be determined taking into account the shapes of the heating and press rollers, peripheral devices and the housing. For example, instead of forming the bearing from a single material, it may be formed by two-color molding method as shown in FIG. 1. That is, the bearing shown in FIG. 1 may have its bearing portion 1 and fixing metal portion 2 formed from different materials.

Figure 2:
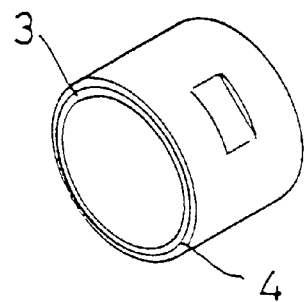
FIG. 2 is a perspective view of another embodiment.
Figure 3:
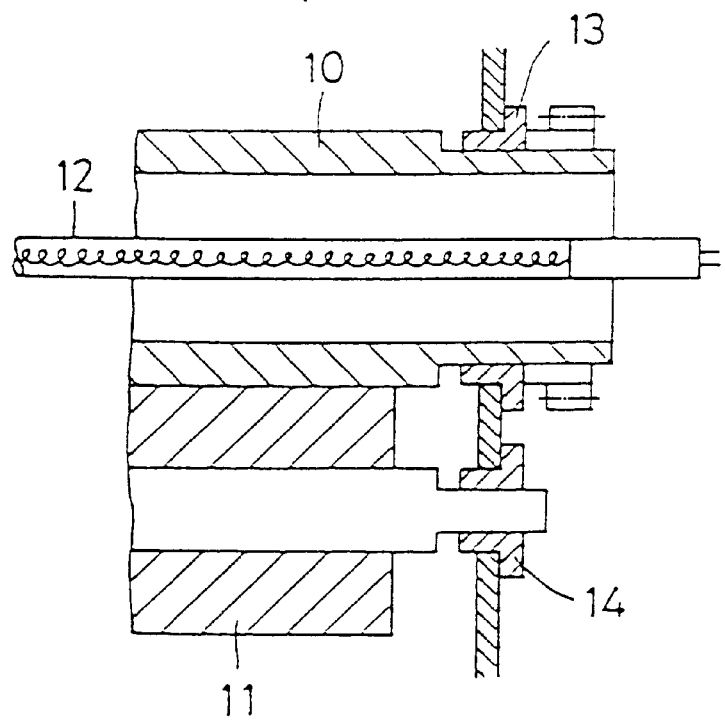
FIG. 3 is a sectional view of a heating/fixing unit, showing the function of its bearings.
Figure 4:
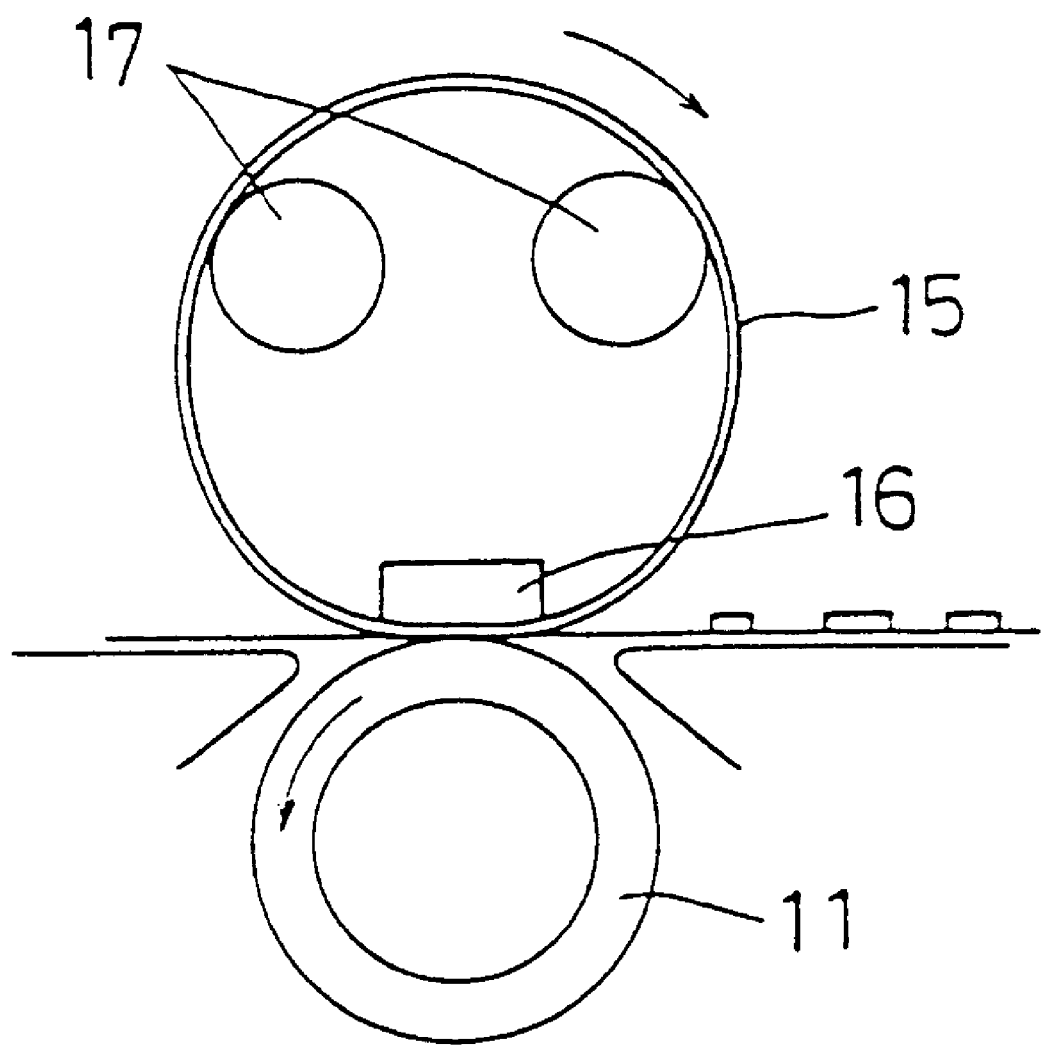
FIG. 4 is a sectional view of another heating/fixing unit, showing the function of its bearings.

Otherwise, as shown in FIG. 2, the heat-resistant bearing according to this invention may be formed by two-color molding method so that it comprises a bearing portion 3 and a resin portion 4 formed from a heat-resistant and heat-insulating resin such as PPS, polyamideimide (PAI) or thermoplastic polyimide (PI) to which are optionally added inorganic or organic fillers.

By heat-treating the molded heat-resistant, lubricative resin composition according to this invention, the thermoplastic polyimide resin will crystallize, so that the sliding properties and mechanical strength of the composition improve. Such heat treatment is preferably carried out for about 0.5–24 hours at 220–340° C.

EXAMPLES

Raw materials used in Examples according to this invention and Comparative Examples are shown below. The contents shown are all in volume percentage.

(1) thermoplastic polyimide resin (TPI) (AURAM #450 by Mitsui Toatsu Chemical)
(2) polyether ketone resin (PEK) (PEEK 150P by VICTREX)
(3) polyetherimide resin (PEI) (ULTEM 1000 by General Electric)
(4) polyethersulfonic resin (PES) (Ultrason E1010 by BASF)
(5) thermotropic liquid crystal polymer (LCP) (SUMICA super LCP E5000 by Sumitomo Chemical)
(6) tetrafluoroethylene resin (PTFE) (KTL 610 by KITAMURA)
(7) aromatic polyester resin (OBP) (SUMICA super LCP E101S2 by Sumitomo Chemical)
(8) para aromatic polyamide fiber (Aramid ①) (Twaron Micro 1088 by Japan Aramid (AKZO), cut fiber length: 0.25 mm)
(9) para aromatic polyamide fiber (Aramid ②) (Kevlar 49 by Dupont Toray Kevlar, cut fiber length: 1 mm)
(10) scaly graphite (graphite) (KS-6, by Lonza)
(11) carbon black (KETJEN black EC-600 JD by LION)
(12) meta aromatic polyamide fiber (Aramid ③) (CONEX by TEIJIN, 2 denier, cut fiber length: 1 mm)

EXAMPLES 1–10

Raw materials shown in Table 1 were supplied into a Henschel mixer at the rates shown in Table 1 and mixed together sufficiently. The mixture obtained was supplied into a twin-screw melt extruder where it is pelletized by melting, mixing and extruding with the cylinder heated to 410° C. and rotated at 100 rpm. The pellets obtained were formed into ring-shaped test pieces 28 mm in outer diameter, 20 mm in inner diameter and 5 mm wide by heating the pellets to 410° C. in a mold heated to 220° C. under the injection pressure of 800 kgf/cm$^2$. The test pieces were heat-treated for 10 hours at 280° C. They were then subjected to a high-temperature radial friction/wear test.

High-temperature radial friction/wear test

Ring-shaped test pieces were each fitted on a mating member, that is, a rotary shaft made of aluminum alloy JIS A5052 (surface roughness 3.2S) and pressed against the outer periphery of the mating member under a load of 3.5 kgf, while controlling the surface temperature of the rotary shaft at 250° C. A torque meter was mounted on the rotary shaft, and the rotary shaft was rotated continuously for 50 hours at a peripheral speed of 9.0 m/min. After the test, the wear (specific wear rate×$10^{-10}$ cm$^3$/(kgf.m)) of each test piece and the torque (kgf.cm) of the rotary shaft were measured. Also, the degree of damage to the mating member was observed. The degree of damage was evaluated in three stages, i.e. no damage (○), slightly damaged (Δ), damaged (X). The results are shown in Table 2.

COMPARATIVE EXAMPLES 1–5

Test pieces were formed in the same way as in Example 1 except the contents of raw materials. They were subjected to the same high-temp. radial friction/wear test. Specific wear rate, torque of the rotary shaft and degrees of damage were measured. They are shown in Table 2. For Comparative Example 6, the composition was so low in viscosity that they were in a molten state when injection-molded. Thus, it was impossible to mold test pieces.

As is apparent from the results shown in Table 2, wear and rotating torque were too large in Comparative Examples 1–5. Also Comparative Examples 1, 2 and 3 markedly damaged the mating members.

In contrast, Examples 1–10 of the invention were low both in wear and rotating torque. Also, they never damaged the mating member made of aluminum alloy (A5052).

The volume resistivity of Example 5 was 5.3×$10^4$ Ω cm, which shows that this composition is a semiconductor.

The heat-resistant, lubricative resin composition according to the present invention has excellent injection moldability, and is low in friction and high in wear resistance. It never attacks or damages a mating member made of a soft alloy such as aluminum alloy.

The heat-resistant sliding bearing formed from the resin compostion according to this invention is heat-resistant, wear-resistant, low in friction and never attack or damage mating members. Such a bearing is especially suited for use as a high-performace heat-resistant sliding bearing in a fixing unit of a copier or a laser beam printer.

TABLE 1

| Composition Ratio | Examples | | | | | | | | | | Comparative examples | | | | | |
|---|---|---|---|---|---|---|---|---|---|---|---|---|---|---|---|---|
| No. | 1 | 2 | 3 | 4 | 5 | 6 | 7 | 8 | 9 | 10 | 1 | 2 | 3 | 4 | 5 | 6 |
| TPI (1) | 65 | 55 | 41 | 29 | 47 | 53 | 55 | 45 | 60 | 55 | 86 | 57 | 58 | 55 | 33 | 63 |
| PEK (2) | — | — | 14 | 20 | — | — | — | 15 | — | — | — | — | — | — | — | — |
| PEI (3) | — | — | — | 5 | — | — | — | — | — | — | — | — | — | — | — | — |
| PES (4) | — | — | — | — | 10 | — | — | — | — | — | — | — | — | — | — | — |
| LCP (5) | — | — | — | 1 | — | — | — | — | — | — | — | — | — | 10 | 30 | — |
| PTFE (6) | 20 | 25 | 25 | 25 | 23 | 25 | 15 | 25 | 25 | 25 | 14 | 3 | 15 | 25 | 20 | 20 |
| OBP (7) | 3 | 10 | 10 | 10 | 8 | 10 | 15 | 5 | 10 | 20 | — | 30 | 2 | — | 5 | 5 |
| Aramid① (8) | 5 | 5 | 5 | 5 | 5 | 12 | — | 5 | — | — | — | 10 | 25 | 5 | 5 | — |
| Aramid② (9) | — | — | — | — | — | — | 3 | — | — | — | — | — | — | — | — | — |
| Graphite (10) | 7 | 5 | 5 | 5 | 5 | — | 12 | 5 | 5 | — | — | — | — | 5 | 7 | 7 |
| Carbon black (11) | — | — | — | — | 2 | — | — | — | — | — | — | — | — | — | — | — |
| Aramid③ (12) | — | — | — | — | — | — | — | — | — | — | — | — | — | — | — | 5 |

TABLE 2

| No. | Specific wear rate ×10⁻¹⁰ in cm³/kgf · m | Rotating torque in kgf · cm | Damage on mating member |
|---|---|---|---|
| Examples | | | |
| 1 | 210 | 0.19 | ○ |
| 2 | 120 | 0.19 | ○ |
| 3 | 90 | 0.18 | ○ |
| 4 | 140 | 0.21 | ○ |
| 5 | 110 | 0.23 | ○ |
| 6 | 230 | 0.21 | ○ |
| 7 | 210 | 0.21 | ○ |
| 8 | 110 | 0.22 | ○ |
| 9 | 250 | 0.20 | ○ |
| 10 | 260 | 0.26 | ○ |
| Comparative examples | | | |
| 1 | 1000 | 0.35 | X |
| 2 | 800 | 0.28 | X |
| 3 | 820 | 0.29 | X |
| 4 | 540 | 0.41 | Δ |
| 5 | 440 | 0.70 | ○ |
| 6 | — | — | — |

What is claimed is:

1. A heat-resistant, lubricative resin composition comprising as a main component a thermoplastic polyimide resin represented by the following formula 1, and 8–38% by volume of tetrafluoroethylene resin and 3–25% by volume of aromatic polyester resin, formula 1

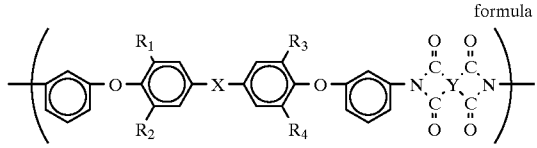

where X is a direct connection or a group selected from the group consisting of a hydrocarbon group having 1–10 carbon atoms, a hexafluorinated isopropylidene group, a carbonyl group, a thio group and a sulfonic group; R1–R4 are hydrogen, lower alkyl groups, lower alkoxy groups, chlorine or bromine, and may be the same or different from one another; Y is a tetravalent group selected from the group consisting of an aliphatic group having two or more carbon atoms, a cyclic aliphatic group, a monocyclic aromatic group, a condensed polycyclic aromatic group, or a non-condensed polycyclic aromatic group made up of aromatic groups coupled together directly or through crosslinking agents, said aromatic polyester resin being a homopolymer having repeating units represented by the following formula 2:

Formula 2

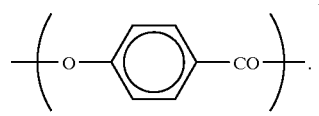

2. A heat-resistant, lubricative resin composition as claimed in claim 1 further comprising 2–20% by volume of para aromatic polyamide fiber.

3. A heat-resistant, lubricative resin composition as claimed in claim 2 wherein said para aromatic polyamide fiber has repeating units represented by the following formula:

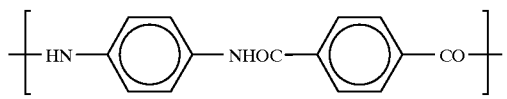

4. A heat-resistant, lubricative resin composition as claimed in claim 1 or 2 further comprising 2–15% by volume of scaly graphite.

* * * * *